US008155664B2

(12) United States Patent
McFarland

(10) Patent No.: US 8,155,664 B2
(45) Date of Patent: Apr. 10, 2012

(54) PORTABLE WIRELESS SENSOR FOR BUILDING CONTROL

(75) Inventor: Norman R. McFarland, Palatine, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 632 days.

(21) Appl. No.: 12/136,556

(22) Filed: Jun. 10, 2008

(65) Prior Publication Data

US 2008/0242314 A1 Oct. 2, 2008

Related U.S. Application Data

(62) Division of application No. 11/206,573, filed on Aug. 17, 2005, now abandoned.

(60) Provisional application No. 60/611,606, filed on Sep. 21, 2004.

(51) Int. Cl.
*H04W 24/00* (2009.01)

(52) U.S. Cl. ............... 455/456.1; 455/456.5; 455/456.3; 455/457; 455/521; 455/572; 340/539.26; 340/539.1; 340/539.13; 340/539.27; 340/572.1

(58) Field of Classification Search ............... 455/456.1, 455/456.5, 456.3, 457, 521, 572; 340/539.26, 340/539.1, 539.13, 539.27, 572.1
See application file for complete search history.

(56) References Cited

U.S. PATENT DOCUMENTS

| | | | | |
|---|---|---|---|---|
| 4,751,689 | A | 6/1988 | Kobayashi | |
| 4,894,810 | A | 1/1990 | Jukkala | |
| 5,266,944 | A | 11/1993 | Carroll et al. | |
| 5,300,875 | A | 4/1994 | Tuttle | |
| 5,491,670 | A | 2/1996 | Weber | |
| 5,638,046 | A | 6/1997 | Malinowski | |
| 5,953,368 | A | 9/1999 | Sanderford et al. | |
| 5,987,058 | A | 11/1999 | Sanderford et al. | |
| 6,078,269 | A | 6/2000 | Markwell et al. | |
| 6,369,710 | B1 | 4/2002 | Poticny et al. | |
| 6,560,462 | B1 | 5/2003 | Ravi et al. | |
| 6,700,533 | B1 | 3/2004 | Werb et al. | |
| 6,735,630 | B1 | 5/2004 | Gelvin et al. | |
| 6,745,038 | B2 | 6/2004 | Callaway, Jr. et al. | |
| 6,774,797 | B2 | 8/2004 | Freathy et al. | |
| 6,856,236 | B2 | 2/2005 | Christensen et al. | |
| 6,990,335 | B1 | 1/2006 | Shamoon et al. | |
| 7,002,470 | B1 | 2/2006 | Miao | |
| 7,035,650 | B1 * | 4/2006 | Moskowitz et al. | 455/456.5 |
| 7,064,660 | B2 | 6/2006 | Perkins et al. | |
| 7,076,211 | B2 | 7/2006 | Donner et al. | |
| 7,081,693 | B2 | 7/2006 | Hamel et al. | |
| 7,142,107 | B2 | 11/2006 | Kates | |
| 7,148,803 | B2 | 12/2006 | Bandy et al. | |
| 7,545,267 | B2 * | 6/2009 | Stortoni | 340/539.26 |

(Continued)

*Primary Examiner* — Ajit Patel
*Assistant Examiner* — Khai M Nguyen

(57) ABSTRACT

A network of wireless radios automatically conserves energy, directs the operation of equipment, and locates assets and personnel. The network may identify changes in the occupancy of a building area and automatically alter the building environment according to predetermined settings, personal preferences, or unexpected conditions. The wireless radios also may include sensors that monitor specific parameters, the parameters may relate to building environment conditions or operating equipment. The network may automatically alter the operating building equipment in response to the parameters received. The wireless radios also may be portable and mounted upon movable items, such as personal identification devices, office furniture, equipment, containers, or other assets. The network may locate the movable items within a building based upon signals received from the wireless radios. The network also may track the movement of the movable items within a building. The wireless radios may operable as a mesh network.

8 Claims, 5 Drawing Sheets

U.S. PATENT DOCUMENTS

| | | | | |
|---|---|---|---|---|
| 7,860,495 | B2 * | 12/2010 | McFarland | 455/420 |
| 2002/0006788 | A1 | 1/2002 | Knutsson et al. | |
| 2002/0016180 | A1 | 2/2002 | Derosier et al. | |
| 2002/0042274 | A1 | 4/2002 | Ades | |
| 2002/0143935 | A1 | 10/2002 | Schenkel et al. | |
| 2003/0007473 | A1 | 1/2003 | Strong et al. | |
| 2003/0012168 | A1 | 1/2003 | Elson et al. | |
| 2003/0020595 | A1 | 1/2003 | Wacyk | |
| 2003/0035342 | A1 | 2/2003 | Harrington et al. | |
| 2003/0051032 | A1 | 3/2003 | Schenkel et al. | |
| 2003/0122677 | A1 | 7/2003 | Kail, IV | |
| 2003/0137968 | A1 | 7/2003 | Lareau et al. | |
| 2003/0142587 | A1 | 7/2003 | Zeitzew | |
| 2003/0146835 | A1 * | 8/2003 | Carter | 340/539.13 |
| 2003/0206115 | A1 | 11/2003 | Krumm et al. | |
| 2003/0234725 | A1 | 12/2003 | Lemelson et al. | |
| 2004/0100394 | A1 | 5/2004 | Hitt | |
| 2004/0104841 | A1 | 6/2004 | Syrjarinne | |
| 2004/0144849 | A1 | 7/2004 | Ahmed | |
| 2004/0183682 | A1 * | 9/2004 | Tenarvitz | 340/573.1 |
| 2004/0212500 | A1 | 10/2004 | Stilp | |
| 2005/0009608 | A1 * | 1/2005 | Robarts et al. | 463/42 |
| 2005/0013292 | A1 | 1/2005 | Johnson et al. | |
| 2005/0040943 | A1 | 2/2005 | Winick | |
| 2006/0046664 | A1 | 1/2006 | Ruhnke et al. | |
| 2006/0044152 | A1 * | 3/2006 | Wang | 340/825 |
| 2006/0071782 | A1 | 4/2006 | Ahmed et al. | |
| 2006/0074494 | A1 | 4/2006 | McFarland | |

* cited by examiner

PORTABLE WIRELESS SENSOR FOR BUILDING CONTROL

PRIORITY AND CROSS-REFERENCE TO RELATED APPLICATION

This application is a divisional of application Ser. No. 11/206,573, filed Aug. 17, 2005, now abandoned which claims the benefit of the file date under 35 U.S.C. §119(e) to provisional application Ser. No. 60/611,606, filed on Sep. 21, 2004, having attorney reference number 2004P16068US, the contents of which are hereby incorporated by reference herein in their entireties.

BACKGROUND

The present embodiments relate generally to wireless networks and building automation systems. More particularly, a wireless network assists the control of automated building control systems and/or locates movable items within a building.

Building control devices are positioned throughout a building. Security, fire, heating, ventilation, air conditioning (HVAC) or other networks of devices automate building control. For example, a temperature sensor or thermostat is mounted to a wall in a room to provide for control to a corresponding actuator located above a ceiling in the room for controlling airflow, heating, or cooling in the room. As another example, a motion sensor is positioned on a ceiling for actuating a light.

Current building automation systems use fixed components, such as controllers, sensors, and actuators, located throughout a building that are hardwired together into an electrical system. Electrically hardwiring components together requires the use of wire, cables, electrical connectors, splices, junction boxes, conduits, and other materials. Hardwiring components also expends manpower to install and maintain the electrical system.

Moreover, current building automation systems are typically hardwired by distinct control systems, such as security, fire, hazard prevention, heating, ventilation, air conditioning (HVAC), or other control systems. The segregation of building control systems inhibits the transfer of information between control systems and may complicate the overall control of the various systems and equipment within a building.

BRIEF SUMMARY

By way of introduction, the embodiments described below include methods, processes, apparatuses, instructions, or systems for employing a network of radios to automatically control building equipment and/or locate and track movable items within a building or other structure. The network may include wireless radios, each including a receiver, a transmitter, a processor, a sensor, and/or an actuator. The network also may employ a dynamic routing algorithm.

An exemplary network receives information from the wireless radios regarding building environmental conditions, changes in the occupancy of a building area, or personal environmental preferences. In response to the data received, the network transmits instructions that automatically alter the operation of building environmental equipment.

The network also may receive information from portable wireless radios mounted on movable items, such as personnel identification devices, office furniture, containers, equipment, or other assets. Based upon the information received, the network may locate and/or track the movement of the movable items within a building.

In a first aspect, a system of radios forming a network is described. The network includes multiple radios, each radio including a receiver and a transmitter. A portable radio having a receiver and a transmitter is wirelessly interconnected with the network. The network or the portable radio determines an area within a building in which the portable radio is located and controls the building environment of the area to be automatically altered from an initial condition.

In a second aspect, a system of radios forming a network is described. The network operates as a mesh network of radios, each radio including a receiver and a transmitter. A portable radio having a receiver and a transmitter is wirelessly interconnected with the mesh network. The portable radio is affixed on a movable item. The mesh network automatically determines the location of the movable item within a building.

In a third aspect, a method of using data received from a network of radios is described. The method includes automatically identifying a change in occupancy for an area of a building based upon data received within or by the wireless network of radios and transmitting data to the network of radios that includes instructions that automatically alter the building environment associated with the area of a building having the change in occupancy.

In a fourth aspect, a computer-readable medium having instructions executable on a computer stored thereon is described. The instructions include receiving data within or by a network of wireless radios, each wireless radio includes a receiver, a transmitter, and a sensor. Each sensor is capable of sensing a value of a parameter. The instructions also include automatically altering the operation of building equipment in response to the data received to change the environmental conditions of a building.

The present invention is defined by the following claims. Nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components in the figures are not necessarily to scale, emphasis instead being placed upon illustrating the principles of the invention.

DETAILED DESCRIPTION OF THE DRAWINGS AND PRESENTLY PREFERRED EMBODIMENTS

A network of radios automatically controls building equipment and/or locates movable items within a building. The network may monitor building environmental conditions and identify (1) changes in the occupancy of a building area, (2) the location of a specific individual or object within a building, and (3) unexpected or emergency building conditions. Subsequently, the network may direct the building equipment to change one or more building environmental conditions in the building area to either conserve energy, accommodate occupancy levels, satisfy personal preferences, or respond to an unexpected building condition. The term "radio" herein refers to a wireless receiver, a wireless transmitter, or a bi-directional wireless transmitter and receiver (transceiver).

The network of radios also may locate and/or track movable items throughout a building. Wireless radios may be mounted on movable items. The movable items may include individual identification devices, desktop computers, laptops, telephones, cell phones, digital devices, pagers, video equipment, televisions, personal digital assistants, chairs, tables, desks, work files, boxes, and other movable assets.

The network may perform asset tracking by automatically determining the location of the movable items within a building. After a movable item on which a wireless radio is mounted has been moved within a building, the wireless radio may communicate location and/or distance information to the network. Subsequently, the network may automatically determine the current position of the movable item within the building or an area in which the object is located.

The automatic asset tracking performed by the network may be more efficient than conventional asset tracking methods that involve manually attempting to locate assets that have been moved from a last known location. For instance, in an office building, work files, office equipment, computers, or other assets may be routinely shifted between personnel, divisions, and departments. However, the current location of the work files, office equipment, computers, or other assets may be forgotten or the assets may become misplaced. The network may automatically update and track the location of any asset, eliminating the need to conduct a manual search for the asset.

The network of radios may track the movement of individuals and visitors throughout a building and automatically identify a breach of security. Specific building areas may be off limits to certain employees or visitors. The network may identify the security breach based upon location or distance information transmitted from an identification device or information transmitted from wireless radios having either motion or infrared sensors.

I. Exemplary Network

Figure 1:
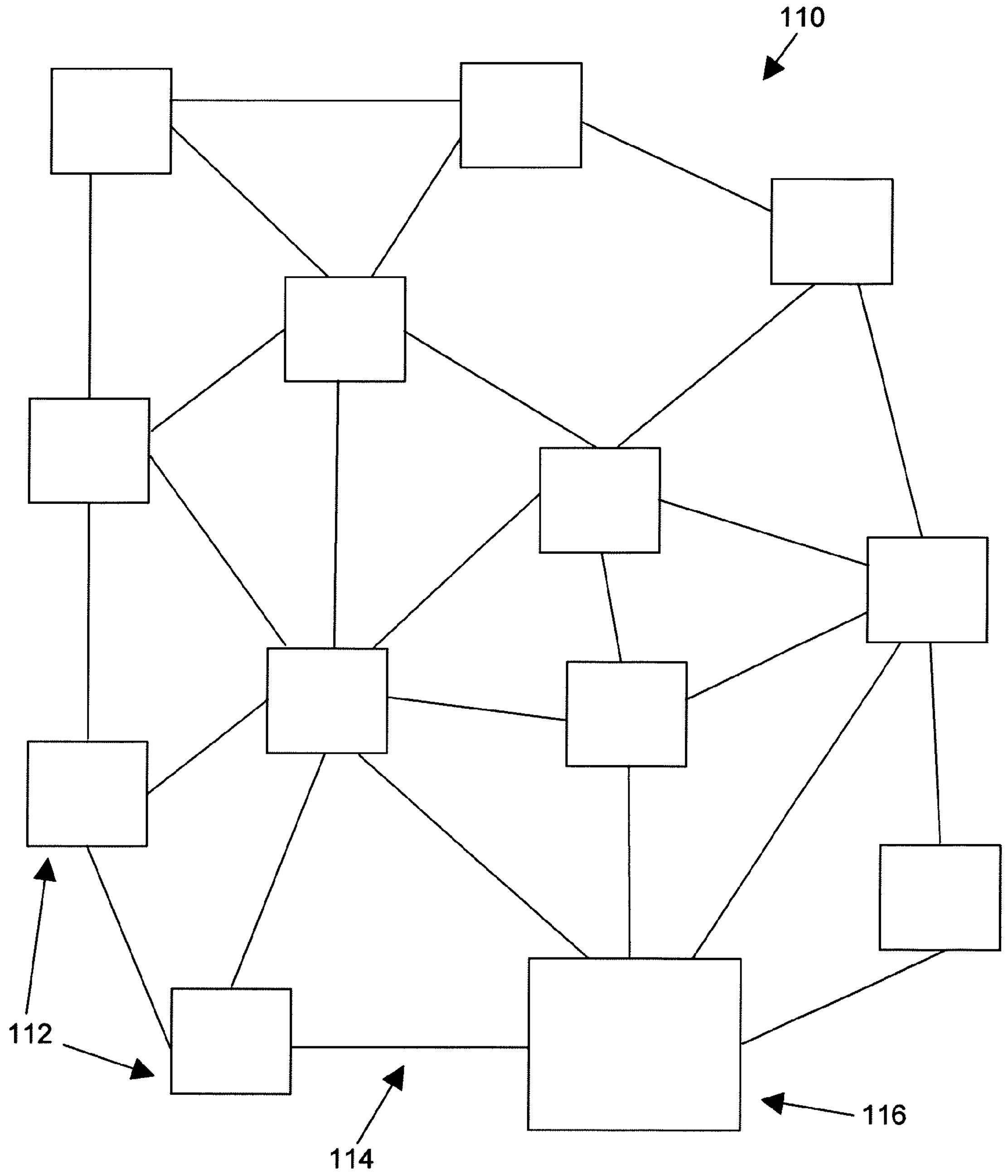
FIG. 1 is a schematic of an exemplary network of wireless radios.

FIG. 1 illustrates an exemplary network 110 of wireless radios 112. The network 110 may utilize a dynamic routing algorithm that permits data transmitted to travel the shortest distance or link 114 between wireless radios 112 to a destination, which decreases the required transmission time for a given message, as well as the required power level of that transmission. The destination may be another wireless radio 112 or a control radio 116. Each wireless radio 112 and control radio 116 may have a dedicated processor, a receiver, and a transmitter. The network 110 may include additional, fewer, or alternate components.

In one embodiment, the network 110 is a network for wireless building automation or control, such as disclosed in U.S. patent application Ser. No. 10/915,034, filed on aug. 9, 2004, entitled Wireless Building Control Architecture, which is incorporated by reference herein in its entirety. In another embodiment, the network 110 is a network for wireless building automation or control, such as disclosed in U.S. patent application Ser. No. 10/955,171, filed on Sep. 29, 2004, entitled Automated Position Detection for Wireless Building Automation Devices, which is incorporated by reference herein in its entirety. Other wireless or wired networks may be provided in alternative embodiments.

Each wireless radio 112 may communicate its associated routing information to every nearby or adjacent wireless radio 112 or control radio 116. After a wireless radio 112 receives a data transmission, a processor of the wireless radio 112 may determine what to do with that data, including whether to retransmit the data to an adjacent or nearby radio 112 or control radio 116. The control radio 116 may function as a network controller that directs the overall operation of the network 110.

The network 110 may provide continuous communication with otherwise unavailable wireless radios 112. For instance, some wireless radios 112 may become obstructed by obstacles, such as equipment, containers, furniture, or other items, or may fail. However, the network 110 may reconfigure itself around blocked paths by redirecting transmission from one radio to the next until communication with a lost radio is re-established. The network 110 also may provide enhanced communication reliability between wireless radios 112 as a single wireless radio 112 may be in direct communication with a number of other wireless radios 112, as shown in FIG. 1.

The network 110 may implement IEEE 802.15.4 protocols. Other protocol standards may be used. The network 110 may operate as a mesh network, as described in more detail below. Alternate control or routing algorithms may be used.

II. Control Of Building Equipment

In general, the network may include multiple wireless radios and one or more control radios that direct the network. Each wireless radio may be a so-called "smart" radio that includes a receiver, a transmitter, a processor, memory, and one or more sensors and/or actuators. Each wireless radio may transmit messages to a control radio acting as network controller. Alternatively, the network controller may be a dedicated processor. The network may have one or more network controllers and/or control radios. The term network herein may include the entire network, a sub-set of a network, a number of wireless radios, one or more network controllers, one or more control radios, or a combination of wireless radios with one or more network controllers or control radios.

A network controller may assimilate and analyze a number of messages received from a plurality of wireless radios. In response to each of the messages received, the network controller may determine that a change in the currently operating building equipment, or the operating modes thereof, is in order. Subsequently, the network controller may transmit a message to one or more wireless radios that direct the operation of building equipment. Upon receiving the message, a wireless radio may alter the operation of building equipment.

The sensors associated with the wireless radios may monitor specific parameters pertaining to building environmental conditions or specific operating equipment. The actuators associated with the wireless radios may control the operation of certain building equipment. A wireless radio may transmit the value of a parameter sensed by a sensor to the network. In response to the values of the parameters received, the network may automatically alter the operation of building equipment, such as by sending messages that operate the actuators that control the building equipment.

For example, the sensors may be temperature sensors that sense the temperature in an area of a building. Each temperature sensor may be connected with a wireless radio, the wireless radios being dispersed throughout a building. Each wireless radio having a temperature sensor may transmit a message to the network regarding the temperature sensed in the building area in which the wireless radio is located. In response to the temperature information received, the network may direct that cooling, heating, ventilation, HVAC, emergency, or other building equipment be operated to alter the building environment of the building area in which the wireless radio is located.

The network may employ multiple wireless radios in each building area to monitor temperature. Conventional wall mounted temperature sensors and/or thermostats may be single point sources of information. However, the average value of individual temperature parameters received from a plurality of temperature sensors dispersed in a given building area may better reflect the actual temperature in the building area. Accordingly, the building environmental equipment may be directed to maintain the temperature of a building area closer to the desired temperature based upon the more accurate temperature information received.

The sensors also may be motion sensors that sense motion in a building area. Each motion sensor may be connected with a wireless radio, the wireless radios being dispersed throughout a building. Each wireless radio having a motion sensor may transmit a message to the network regarding the motion sensed in a building area. In response to the motion information received, the network may direct the operation of building equipment.

The motion detected may alert the network that a building area has recently become occupied or unoccupied. In response, the network may ensure that lighting equipment provides adequate light in or near the building area in which motion was sensed. The network may direct that building environmental equipment, such as cooling, heating, ventilation, HVAC, or other equipment, be operated to alter the building environment of the building area. The motion information received also may be used by the network to determine that a security breach has occurred. Accordingly, the network may trigger an alarm, secure passageways, and operate other security equipment in response to the security breach.

A wireless radio may be connected with an identification device located on an individual. After the wireless radio located on the identification device transmits a message to the network, the network may determine the identification and/or location of the associated individual. In response, the network may transmit instructions to building environmental equipment to automatically alter the environmental conditions of the specific building area in which the individual is currently located based upon stored or transmitted environmental preferences associated with that individual.

The current temperature of a building area may be hotter, colder, brighter, or darker than an individual's personal preferences. The network may recognize the identity of a particular individual that has recently entered the building area, such as by a unique identification code transmitted by the wireless radio affixed to an identification device. The network may receive or retrieve the individual's personal preferences regarding environmental conditions from a database using the unique identification code. After which, the network may direct building environmental equipment to alter the environmental conditions of the specific building area in which the individual is currently located to satisfy the individual's personal preferences, such as by increasing or decreasing the temperature or changing the amount of lighting in a given area.

The network also may more generally recognize that a building area, such as a room or a floor, has recently become occupied or unoccupied or that the total number of personnel in the area has increased or decreased. As a result, the network may direct building environmental equipment to alter the building environment accordingly.

For instance, if a building area becomes occupied, it may be desirable to automatically operate lighting equipment to increase the amount of lighting available or automatically operate heating or cooling equipment to increase or decrease the temperature of the building area, respectively, depending upon the current building area temperature. Additionally, if a building area becomes unoccupied, energy usage associated with operating building equipment that control the environmental conditions associated with that building area may be conserved. The network may conserve energy by automatically securing lighting, heating, or cooling equipment no longer needed to be operated to make the building area more acceptable or amenable for occupancy by typical personnel.

The exact level or density of occupancy also may determine whether to automatically change environmental conditions. Such as, if only a single person is in a building area, it may not be desirable to dramatically alter the lighting conditions or the temperature of the building area. It may be inefficient to increase or decrease the temperature of a large building area for a single person. It also may be inefficient to significantly alter the lighting of a large building area based upon the presence of single individual.

A single person may only occupy a building area for a short period of time, such as in the case of a patrolling security officer conducting routine nightly security checks. In such a case, altering the operation of building environmental equipment to change the building environment may not be desired. Similarly, only a single individual may occupy an office during a typical work day. However, during the work day, that person may enter and exit the office numerous times. Hence, after the network has detected an individual's initial presence during a normal work day, it may not be desirable to further operate building environmental equipment to alter the building environment of that office, other than maintain the desired environmental conditions, until it is determined that the individual has left the building for the day.

The network may determine that an individual has left the building for the day by periodically querying a wireless radio associated with an individual's identification device to determine if the individual remains within the building. Alternatively, the network may determine that an individual has left the building for the day based upon the time of day and/or that individual's usual work schedule. Therefore, in some instances, it may be desirable to not alter building environmental conditions based only upon the occupancy of a building area by a single individual.

As noted above, if a building area becomes unoccupied, it may be energy efficient to either secure building equipment, such as lighting, heating, or cooling equipment, or reduce the amount of equipment operating. The temperature of the building area may be allowed to drift up or down to a predetermined level or automatically returned to a default level. After the temperature of the building areas reaches the predetermined or default level, heating or cooling equipment may be subsequently operated to maintain the temperature of the building area at approximately the predetermined or default level.

In a building having numerous pieces of operating equipment, it may be desirable to automatically monitor various parameters associated with various pieces of equipment. For instance, in a power plant, refinery, factory, or other plant, it may be advantageous to monitor temperatures, pressures, alarms, tank levels, bilge levels, hydraulic levels, atmospheric conditions, operating pumps or fans, and other parameters. The change in various temperatures, pressures, levels, or equipment operating temperatures may indicate problematic conditions.

The network may automatically identify problematic conditions associated with operating building equipment. The various parameters monitored each may be sensed by a sensor on a wireless radio. The wireless radio may transmit the value of the parameter to the network, either periodically or upon being queried by the network or sensing an out of specification value. The wireless radio may determine whether a parameter is within specification, i.e., a predetermined satisfactory range.

If a parameter is not within specification, the network may take corrective action to restore the parameter and/or building conditions to specification. For example, the running speed of a problematic piece of equipment may be shifted, increased, or decreased. The problematic piece of equipment also may be secured and an alternate piece of equipment may be started or placed on line to replace it. Additional, fewer, or alternate courses of action may be taken to correct problematic or out of specification parameters.

III. Locating Movable Items

Wireless technology permits a network of wireless radios or sensors to be built without the accompanying wiring between the radios/sensors and associated actuators and controllers. Additionally, the wireless radios and sensors may be self-powered and have a dedicated power supply. Hence, wireless radios/sensors may not be limited to a typical master slave relationship with a controller or actuator. As a result, wireless radios and sensors may be portable and affixed to movable items.

The portable wireless radios may be mounted upon various types of movable items, such as personal identification devices (e.g., cards or badges), office furniture, packages, containers, equipment, computers, monitors, televisions, telephones, electronic devices, and other assets. The network may locate and track the movable items within a building, such as an office building, a plant, a factory, or other structure, based upon signals received from the portable wireless radios. For example, the network may determine that a specific movable item, such as an individual, a container, a piece of equipment, or other asset, is located within a particular area of a building, such as a room, level, or floor. The network may continuously or periodically locate a specific movable item to track its movement throughout a building.

The network may determine the location of the movable items via triangulation techniques, GPS coordinates, unique identifiers, time of flight techniques, signal strength and/or other location techniques. For large areas of buildings, such as a warehouse, multiple fixed receivers may receive a signal from a movable item. The network may triangulate the exact or approximate position of the movable item using bearing and direction information from which the signal transmitted from the movable item originated or may use measured distances from several items. Alternatively, the network may receive latitude, longitude, and elevation coordinates from a wireless radio having a GPS unit. The network may compare the coordinates received from the movable item to the coordinates of the building to determine the location of movable item within the building. The network may determine an area from which devices may receive a transmission from the wireless radio.

The wireless radio also may be non-portable and mounted to a non-movable object or piece of equipment, such as permanently installed on pumps, fans, ducts, dampers, valves, fans, or other equipment or mounted to a wall or ceiling. In such a case, the network may determine the location of the non-portable wireless radio based upon a unique identification code. For instance, whenever the non-portable wireless radio transmits a message to the network, it also may transmit a unique identification code, such as a 64 bit identifier. After the message is received by the network, the network may compare the identifier with identifiers stored in a memory. The identifiers stored in memory may be arranged in a data structure, such as a table or array, and associated with specific coordinates within the building or with a building area. A match of the identifier associated with the wireless radio transmitting the message with one stored in memory may permit the network to identify the location of the non-portable radio.

In one embodiment, a wireless radio may be readily located using mapped locations of all of the wireless radios within a network. The map may be generated in real-time as locations for wireless radios are identified or may be stored in a memory device. A listing, map, chart or blueprint including the determined locations may be generated and displayed on a video monitor. The video monitor may be a fixed monitor, such as a computer monitor, or may be portable, such as a handheld display. The map also may be a real-time map that may be updated to display a current position or location of a wireless radio as the movable item on which the wireless radio is mounted moves about a mapped environment. The position of each wireless radio may be determined periodically or in real-time. A wireless radio transmitting a message also may be displayed on the chart with respect to the building structure and/or momentary position of the movable item.

The wireless radios may employ active and/or passive technology. The wireless radios may go active to transmit their current location or sensor readings on a periodic basis, such as every half hour or hour. The portable radios also may transmit their current location or sensor readings after being queried by the network. When a specific movable item is desired to be located, the network may query the wireless radio and the wireless radio may report the position of the movable item.

IV. Unexpected Building Conditions

The automatic control of building equipment and/or locating and tracking of individuals may be used for security, emergency, search and rescue operations, or other purposes. While access to areas of a building may be generally unrestricted, a number of areas may be off-limits to unauthorized personnel, such as research labs or other sensitive areas. Accordingly, each personal identification device may be used to determine if an individual is currently in an area, room, floor, or level for which they are not authorized. Motion sensors, infrared sensors, and other sensors also may detect security breaches.

Additionally, personal identification devices, motion sensors, infrared sensors, and other sensors may be used to locate personnel in need of assistance during unexpected building conditions. The unexpected building conditions may include fires, power outages, flooding, chemical spills, the release of biological or radioactive agents, or other emergencies. For instance, people may be endangered by fire, smoke, chemicals, or other hazardous conditions. Moreover, as a result of power outages, people may become disorientated in darkened passageways and stairwells or trapped in disabled elevators.

The personal identification devices may be integrated with a network such that the network may quickly locate and identify those in need of assistance or that have breached security. The specific identification of those in need of assistance or that have breached security, such as by unique identification code, may provide valuable information to rescue, security, police and fire department, and/or medical personnel. For example, infants, children, elderly, and handicapped citizens may require more assistance during unexpected building conditions than the average adult. Additionally, the identification of a specific individual that has breached security may alter the level of response by security personnel. Therefore, locating, as well as identifying, the individuals in need of assistance or that have breached security may enhance the efficiency and effectiveness of the personnel responding to an emergency situation.

In response to an unexpected building condition or emergency, the network may operate building equipment. For example, if fire or smoke is detected, the network may direct that one or more fire alarms be sounded. Fans providing air into the building area where the fire is located may be secured and/or dampers be moved to prevent fresh air from feeding the fire. Additionally, the network may direct that pumps, valves, sprinkler systems, or other equipment be operated to direct water, foam, or other anti-fire agents into the building area where the fire is located. The network may direct that lighting equipment in the building area near the fire be operated.

Likewise, in the case of other unexpected conditions, such as a security breach, a power outage, a chemical spill, or other hazardous condition, the network may direct lighting equipment to either increase or decrease the level of lighting in the building area affected by the unexpected conditions. The network also may direct building equipment to alter the amount of fresh air entering the building area affected by the unexpected condition, such as by altering fans, chillers, ducts, dampers, or other ventilation equipment. In the case of a power outage or other emergency, the network may operate back up generators that power emergency lighting equipment.

During an unexpected building condition, the network may query wireless radios located throughout the building to determine the current extent of the emergency. For instance, during a fire, a chemical spill/release, or other hazardous condition, the network may query wireless radios having temperature, smoke, fire, chemical, and other sensors or detectors located throughout a building to determine the current extent of the unexpected condition. The network also may query wireless radios to determine the current location of people within the building. Additionally, during a security breach, the network may query wireless radios to determine the extent of the security breach and the current location of unauthorized personnel within the building. The current location of unauthorized personnel may be determined by motion sensors, infrared sensors, temperature sensors, or other sensors mounted on wireless radios dispersed throughout a building.

V. Mesh Network

In one embodiment, the network may include a number of wireless radios arranged as a mesh network that also may be used to locate movable assets and/or operate building environmental equipment. The mesh network provides the capability of routing data and instructions between and among the network of radios. The mesh network permits data to be to be efficiently transmitted from one radio in the network to the next until the data reaches a desired destination.

The mesh network may be implemented over a wireless network or partially wireless network. Each radio within the network may function as a repeater that transmits data received from adjacent radios to other nearby radios that are within range. The coverage area of the mesh network may be increased by adding additional radios. As a result, a network may be established that may cover an area of desired size, such as a floor of a building or an entire building.

Each radio within the mesh network is typically only required to transmit data as far as the next radio within the network. Hence, if a wireless radio has a limited power supply, the reduction in the distance that each radio is required to transmit permits lower power level transmissions, which may extend the operating life of the power supply.

A number of protocols may be used to implement the mesh network. The radios may implement a protocol that uses low data rates and low power consumption. As noted above, the mesh network may employ devices that use very small amounts of power to facilitate significantly increased battery or power supply life. In some situations, power supply life may be extended by minimizing the time that the radio device is “awake” or in normal power using mode, as well as reducing the power at which a signal is transmitted.

Alternatively, the radios may implement a protocol that uses moderate or high data rates and power consumption. For instance, the radios may implement IEEE 802.11 protocols. An IEEE 802.11 LAN may be based on a cellular architecture where the system is subdivided into cells, where each cell is controlled by a base station. Other protocols may be implemented.

Additionally, by reducing the distance between radios, each radio may be able to transmit signals at a reduced power level, which may extend the life of a power supply while the signals transmitted remain strong enough to reach an adjacent radio. The radios within the network may be synchronized such that each radio talks or listens at a particular time. Alternatively, one or more control radios may be generally active, while the remaining radios remain predominantly passive. The control radios may be hardwired directly to a power supply such that they are not confined by a limited power supply.

The mesh network may utilize the Zigbee protocol or other IEEE 802.15.4 Low-Rate Wireless Personal Area Network (WPAN) standards for wireless personal area networking. Zigbee is a published specification set of high level communication protocols designed for use with small, low power digital radios based upon the IEEE 802.15.4 standard. Other IEEE 802.15 standards also may be implemented, including those using Bluetooth or other WPAN or WLAN protocols or any other protocol.

The mesh network of wireless radios may employ a dynamic routing algorithm. As a result, the mesh network may be self configuring and self mending. Each wireless radio within the network may be able to identify neighboring radios. After receiving a message, a receiving wireless radio may determine that it is not the wireless radio closest to the destination and/or that it should not relay the message to another radio based upon the currently known configuration of operating wireless radios. The receiving wireless radio may wait a predetermined period and listen for another radio to relay the message. If after a predetermined time, the wireless radio determines that the message has not been relayed as expected, the receiving wireless radio may transmit or relay the message to a nearby wireless radio.

By transmitting messages to only reach nearby or adjacent radios in the network, the messages within the network may be transmitted at lower power. The low power transmission requires less energy from the on-board power supply of each wireless radio. Additionally, the low power transmissions by the wireless radios prevent one message from occupying the entire network and permits messages to be simultaneously transmitted from different wireless radios and travel throughout the network of radios in parallel.

The transmission of multiple messages in parallel may be useful during unexpected or emergency conditions. For example, if a fire is detected in zone 1 of a building, a wireless radio having a fire or smoke sensor may transmit a message to the network indicating that there is a fire in zone 1. The wireless radio or the network may operate one or more alarms indicating that all personnel should evacuate zone 1.

The network may then query wireless radios in building areas near zone 1 to determine the extent of the fire. Alternatively, wireless radios in building areas near zone 1 may automatically transmit messages to the network regarding the current status of the associated building area in response to receiving the message from the wireless radio in zone 1 regarding the unexpected condition. Therefore, the network may quickly determine whether additional zones need to be evacuated.

Additionally, after the initial message is transmitted indicated an unexpected condition in zone 1, all other wireless radios located in zone 1 sensing the same unexpected condition need not transmit a message to the network indicating an unexpected condition in zone 1. Hence, valuable network bandwidth may be saved during an unexpected or emergency situation for transmitting other messages. For example, in response to the message indicating an emergency in zone 1, the network may operate building equipment by sending messages that direct the operation of building equipment in and around zone 1, as well as the building equipment that may effect conditions within zone 1. The network may quickly operate ventilation, fans, pumps, ducts, dampers, and other building equipment. In the case of a fire, the network may secure ventilation to zone 1, pressurize a fire main that supplies zone 1, initiate a sprinkler system in zone 1, and/or operate emergency lighting in zone 1. Therefore, during an unexpected or emergency situation, the network may quickly identify and notify personnel that should evacuate a building area and, with little delay, rapidly operate equipment to counteract the situation.

VI. Exemplary Embodiments

Figure 2:
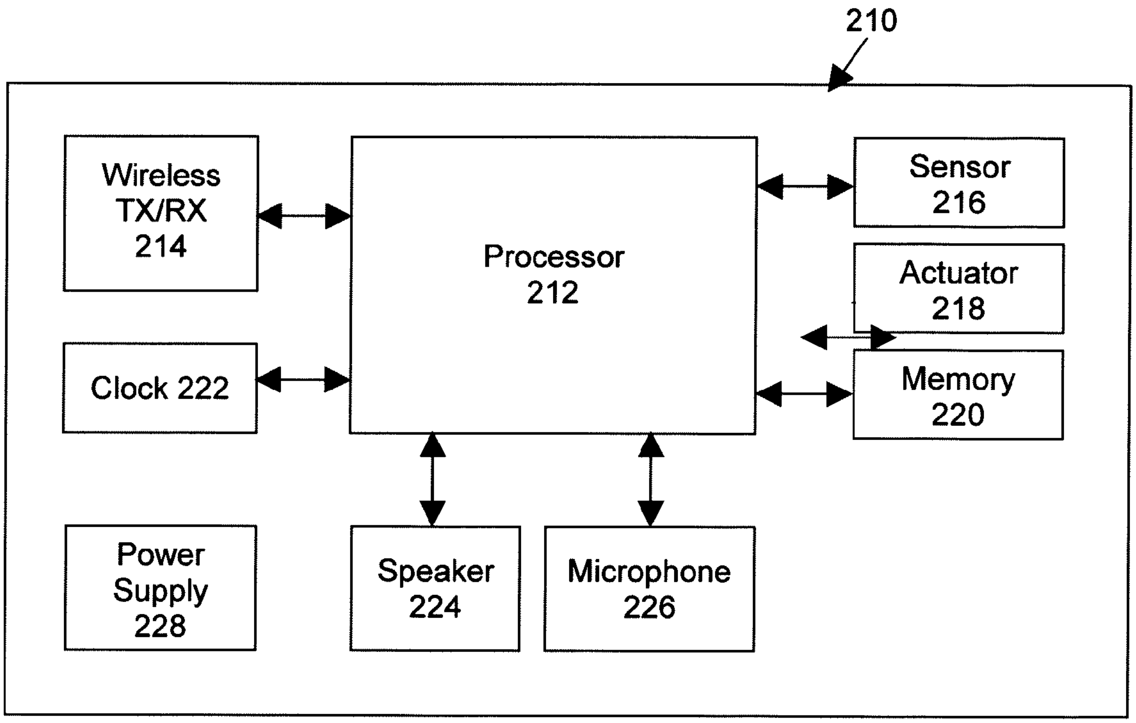
FIG. 2 is a block diagram of an exemplary wireless radio.

FIG. 2 illustrates an exemplary wireless radio 210 for automatically controlling building equipment and locating movable items within a building. The wireless radio 210 includes a processor 212, a wireless radio frequency transmitter and/or receiver 214, a sensor 216, an actuator 218, a memory 220, a clock 222, a speaker 224, a microphone 226, and a power supply 228. The wireless radio 210 may include additional, different, or fewer components.

The wireless radio 210 may be free of the sensor 216, actuator 218, memory 220, clock 222, speaker 224, the microphone 226, and/or power supply 228. For example, the wireless radio 210 may consist of the processor 212 and the wireless transmitter and/or receiver 214.

Figure 3:
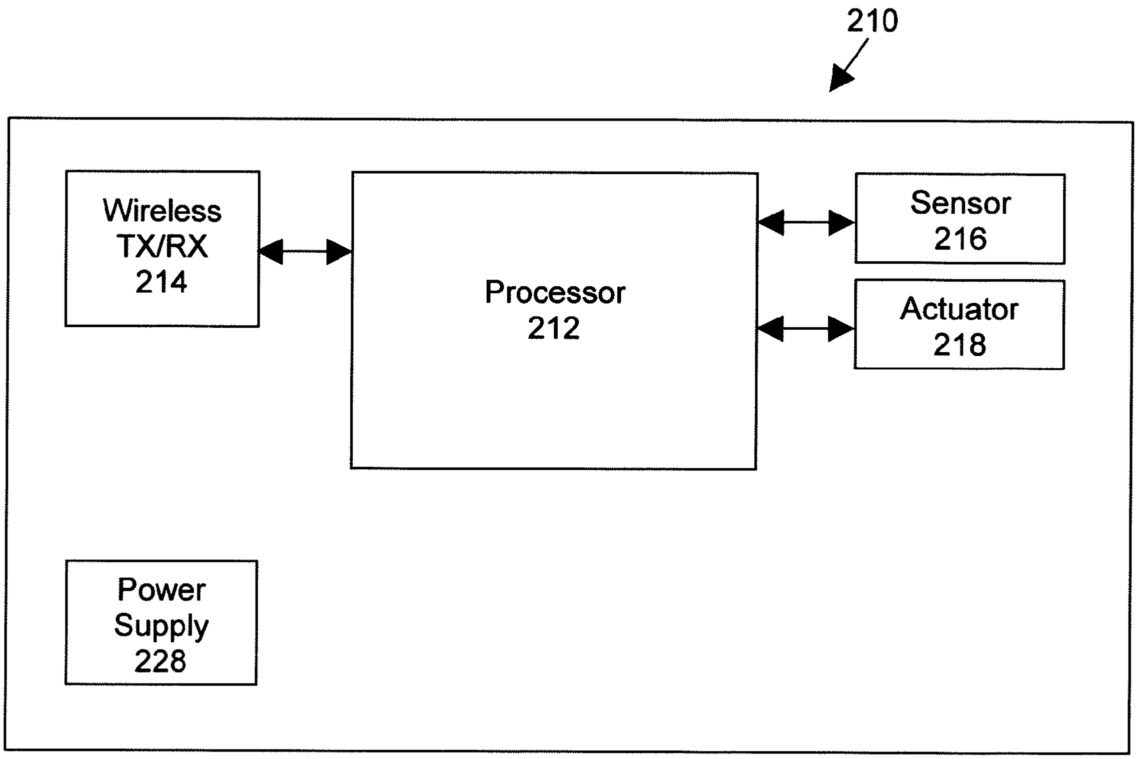
FIG. 3 is a block diagram of another exemplary wireless radio.
Figure 4:
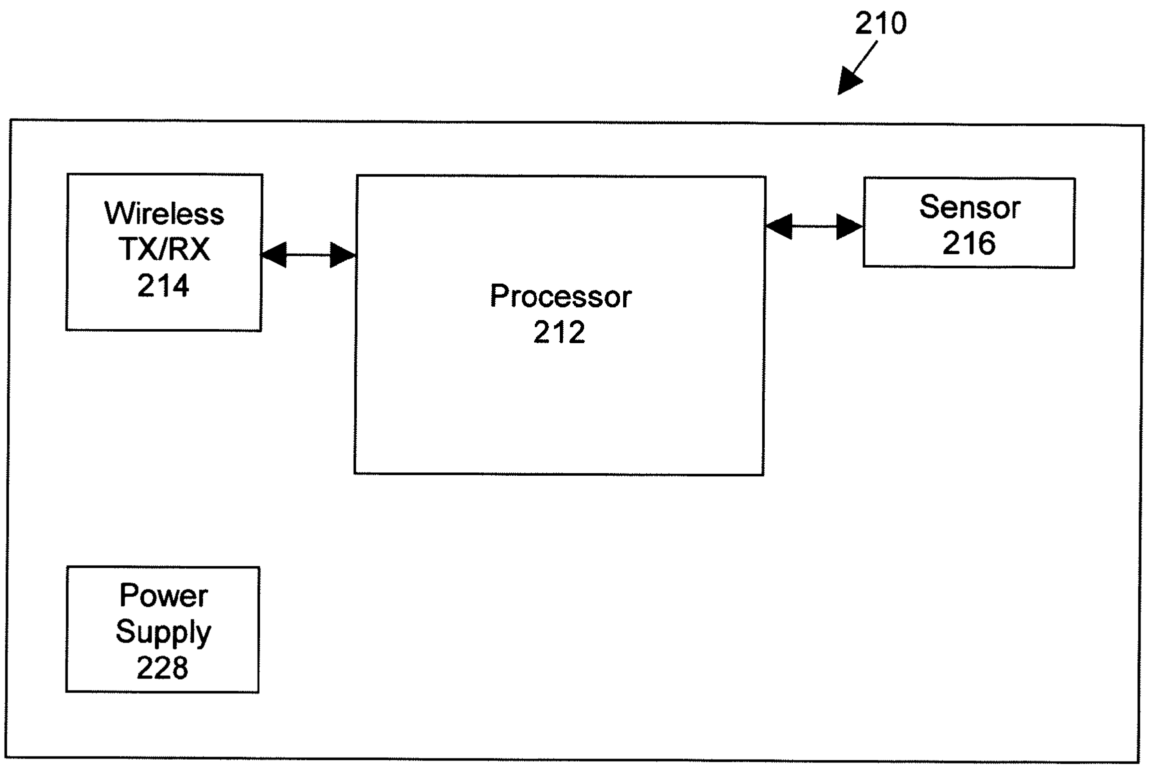
FIG. 4 is a block diagram of another exemplary wireless radio.

FIGS. 3 and 4 each illustrate another exemplary wireless radio 210 for automatically controlling building equipment and locating movable items within a building. The wireless radio 210 of FIG. 3 includes a processor 212, a wireless radio frequency transmitter and/or receiver 214, a sensor 216, an actuator 218, and a power supply 228. The wireless radio 210 of FIG. 4 includes a processor 212, a wireless radio frequency transmitter and/or receiver 214, a sensor 216, and a power supply 228. The wireless radio 210 may include other combinations employing additional, different, or fewer components.

The wireless radio 210 may be portable, such as in the case of being mounted upon a movable item, or affixed at a specific location or to an immovable item. The wireless radio 210 may be a controller, actuator, sensor, locator or other device in a security, fire, environment control, HVAC, lighting, or other building automation system. The wireless radio 210 may determine it's present location, sense conditions within a building, report conditions within a building, generate a signal representative of a building condition, and/or respond to an interrogator. The wireless radio 210 also or alternatively may actuate building control components. As a controller, the wireless radio 210 may be free of the sensor 216 and/or the actuator 218.

In one embodiment, the wireless portable radio 210 includes a wired connection to one or more other portable radios 210 within the network. In yet another embodiment, the wireless radio 210 is a wireless device free of wired connections to other devices making the wireless radio 210 portable.

The sensor 216 may be a single sensor or include multiple sensors. The sensor 216 may be a temperature, pressure, humidity, fire, smoke, occupancy, air quality, flow, velocity, vibration, rotation, enthalpy, power, voltage, current, light, gas, $CO_2$, CO, $N_2$, $O_2$, chemical, radiation, fluid level, tank level, motion, Global Positioning System (GPS), infrared, or other sensor or combination thereof. The sensor 216 also may be a limit or proximity switch. Alternate sensors may be used.

The sensor 216 may be a motion sensor that detects when a portable wireless radio 210 is moving. If it is sensed that the wireless radio 210 is moving, the processor 212 may wake the wireless radio 210 up from a sleep mode that draws less energy from the power supply 228. Upon waking up, the wireless radio 210 may transmit via the wireless transmitter 214 to the network a message indicating that wireless radio 210 is moving.

The sensor 216 may be motion sensor that detects when there is movement within a predetermined distance. For example, the sensor 216 may be wall mounted to detect when an individual has entered a specific building area. If the building area was previously unoccupied, the wireless radio 210 on which the sensor 216 is mounted may transmit a message to the network that the building area is no longer unoccupied. As a result, the network may direct that the environmental conditions be altered accordingly, such as increase the temperature during cold weather, decrease the temperature during hot weather, turn on one or additional lights, or adjust the room to the individual's personal preferences.

The sensor 216 may be a GPS unit capable of receiving GPS signals and determining the location of the wireless radio 210. The GPS unit may be able to determine the latitudinal and longitudinal coordinates, as well as the elevation, of the wireless radio 210. The location of the wireless radio 210 determined by the GPS unit may be subsequently transmitted to the network via the wireless transmitter 214.

The actuator 218 may be a single actuator or include multiple actuators. The actuator 218 may be a valve, relay, solenoid, speaker, bell, switch, motor, motor starter, turbine generator, motor generator, diesel generator, pneumatic device, damper, or pump actuating device or combinations thereof. For example, the actuator 212 may be a valve for controlling flow of fluid, gas, or steam in a pipe, or a damper controlling or redirecting air within an air duct. As another example, the actuator 212 may be a relay or other electrical control for opening and closing doors, releasing locks, actuating lights, or starting, stopping, and shifting motors and pumps. As a further example, the actuator 212 may be a solenoid that opens or closes valves, dampers, or doors, such as for altering the flow of fluid or air within piping or ducting. Alternate actuating devices also may be used.

The wireless radio 210 may function as a controller. The controller may be positioned at either a known or an unknown location. As a controller, the wireless radio 210 interacts with other wireless radios 210 for control or reporting functions.

The processor 212 is capable of processing data and/or controlling operation of the wireless radio 210. The processor 212 may be a general processor, digital signal processor, application-specific integrated circuit (ASIC), field programmable gate array, analog circuit, digital circuit, network of processors, programmable logic controller, or other processing device. The processor 212 may have an internal memory.

The wireless radio 210 also may have a memory unit 220 external to the processor 212. The memory unit 220 may store data and instructions for the operation and control of the wireless radio 210. Additional or alternate types of data also may be stored in the memory unit 220.

A program may reside on the internal memory or the memory unit 220 and include one or more sequences of executable code or coded instructions that are executed by the processor 212. The program may be loaded into the internal memory or memory unit 220 from a storage device. The processor 212 may execute one or more sequences of instructions of the program to process data. Data may be input to the data processor 212 with a data input device and/or received from a network. The program and other data may be stored on or read from machine-readable medium, including secondary storage devices such as hard disks, floppy disks, CD-ROMS, and DVDs; electromagnetic signals; or other forms of machine readable medium, either currently known or later developed.

The processor 212 is capable of directing the transmission or reception of data by the wireless transmitter or receiver 214, the speaker 224 or the microphone 226. For example, the processor 212 may direct the acoustic speaker 224 to transmit an ultrasound signal. The processor 212 may also direct the microphone 226 to receive an ultrasound signal and determine a distance from another device as a function of the received signal. Alternatively or additionally, the processor 212 may direct the wireless transmitter or receiver 214 to transmit data for determining the distance. Additionally or alternatively, the wireless transmitter 214 transmits a determined distance or distances as well as data regarding the processes and operation of the sensor 216 and/or the actuator 218.

The wireless transmitter and receiver 214 or the speaker 224 may be alternate wireless transmitters capable of transmitting a signal for distance determination. Similarly, the wireless receiver 214 and microphone 226 may be alternative wireless receivers capable of transmitting a signal for distance determination.

The processor 212 also may be operable to perform distance determination functions. The processor 212 may determine a distance between wireless radios 210 or a portable wireless radio 210 and a reference point, such as a known location in a building. The processor 212 may be mounted on a wireless radio 210 that is affixed to a specific location. That processor 212 may store in memory 220 a coordinate system including the specific location. By determining the distance and direction to another wireless radio 210, such as one that is portable and mounted upon a movable item, the processor 212 may determine the location of the movable item. The distance to another wireless radio 210 may be determined by time-of-flight or other technique. The direction to another wireless radio 210 may be determined by signal strength of the received signal or other technique. Subsequently, the processor 212 may direct that the wireless transmitter 214 transmit the location of the movable item to the network.

Instead of determining a distance and direction to another wireless radio 210, each portable wireless radio 210 may include a sensor 216 that is a GPS unit that determines the current location of the wireless radio 210. The processor 212 of each wireless radio 210 having a GPS unit may direct that the wireless transmitter 214 transmit the location of the wireless radio 210 to the network. Other wireless radios 210 within the network may store a map of coordinates in memory 220. Each wireless radio 210 also may store its own coordinates in memory 220, the coordinates may be predetermined or static if the wireless radio is affixed to permanent location. Alternatively, each wireless radio 210 may determine its coordinates from its dedicated GPS unit.

Figure 5:
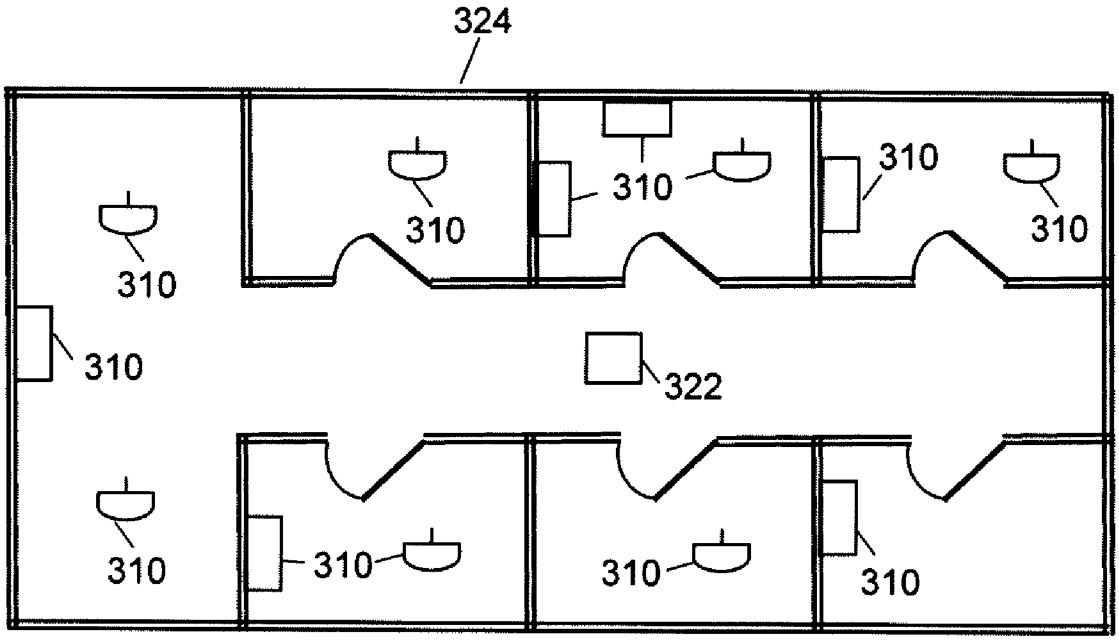
FIG. 5 is a top plan view of an exemplary network of wireless radios within a building.

FIG. 5 illustrates a floor layout for a network of wireless radios 310 operating with one or more control radios 322 within a building 324. The wireless radios 310 may be dispersed throughout the building 324. One or more of the wireless radios 310 may be located in each room or other building area. Alternate dispersed arrangements of the wireless radios 310 may be provided. While one control radio 322 is shown, a plurality of control radios 322 may be provided in other embodiments. Additional, different or fewer wireless radios 310 and control radios 322 may be provided. While shown as a single floor of a building 324, the network of wireless radios 310 and control radios 322 may be distributed over multiple floors, a portion of the floor, a single room, a house, a structure, or any other building 324 or portion thereof.

The various wireless radios 310 may be of the same configuration or a different configuration than each other. For example, some of the wireless radios 310 may correspond to sensor arrangements, such as shown in FIG. 3 above, while other wireless radios 310 may correspond to actuator arrangements, such as shown in FIG. 4 above. The same or different communication device, such as a wireless radio frequency transmitter and/or receiver, may be provided for each of the wireless radios 310. Alternatively, different communications mechanisms and/or protocols are provided for different groups of the wireless radios 310. The wireless radios 310 may operate in an integrated manner for implementing one or multiple types of building automation control. Alternatively, different networks may be provided for different types of building automation, such as security, HVAC, heating, ventilation, and fire systems.

The control radio 322 may be a wireless radio 310 without a sensor or actuator. Alternatively or in addition, the control radio 322 includes a sensor and/or actuator, and is operable to provide control services for other wireless radios 310. The control radio 322 may wirelessly communicate with one or more of the dispersed wireless radios 310. For example, acoustic or radio frequency communications may be provided.

A distance determination may be made between a control radio 322 and one or more wireless radios 310, between wireless radios 310, between one or more wireless radios 310 and a reference point, between one or more control radios 322 and a reference point, or any combination thereof. A calculation that determines the distance may be performed by a processor associated with a control radio 322, a wireless radio 322, or other radio. The reference point may be any point or position having a known or predetermined location or coordinate identification within the building. The reference point may be the known or predetermined location within a building structure for a control radio 322, a wireless radio 310, or any other known area from which distances may be determined. The distances may be determined without information or control from the control radio 322. Alternatively, the control radio 322 triggers, controls or alters the distance determination between two given wireless radios 310. In other embodiments, the distance associated with the wireless radio 310 is performed relative to the control radio 322, such as where the position of the control radio 322 is known.

The distance determination may be performed using wired or wireless transmissions. Wireless radio frequency transmissions and receptions between building automation components within a network, between a component and a reference point, or between similar components for determining a distance may be performed. Spread spectrum or code phasing may be used for distance determinations. The distance may be determined as the result of one or more radio-frequency communications of a test signal, may be based on transmission and reception of acoustic signals, such as an ultrasound signal, or combinations thereof. The distance determination may be a one-way distance determination based upon the time-of-flight from the transmission of the signal to the reception of the signal. Clocks or time stamps may provide accurate relative timing. Alternatively, the distance determination may be made based upon two-way communications using a predetermined time-delay. In one embodiment, the distance measurement or control scheme may be performed as disclosed in U.S. patent application Ser. No. 10/937,078, filed on Sep. 9, 2004, entitled Distance Measurement for Wireless Building Automation Devices, which is incorporated by reference herein in its entirety. Other control schemes or mechanisms may be used.

While the invention has been described above by reference to various embodiments, it should be understood that many changes and modifications can be made without departing from the scope of the invention. The description and illustrations are by way of example only. Many more embodiments and implementations are possible within the scope of this invention and will be apparent to those of ordinary skill in the art. The various embodiments are not limited to the described environments, and have a wide variety of applications including integrated building control systems, environmental control, security detection, communications, industrial control, power distribution, and hazard reporting.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

The invention claimed is:

1. A building automation system of radios forming a network, the system comprising:

a mesh network of wireless radios, each wireless radio having a receiver and/or a transmitter;

a portable radio wirelessly interconnected with the mesh network, the portable radio having a receiver and a transmitter, wherein the portable radio is affixed on a movable item;

wherein the mesh network is configured to (1) query the portable radio periodically, and (2) automatically determine the current location of the movable item within a building based upon signals and/or data automatically transmitted by the portable radio to the mesh network in response to the query from the mesh network;

wherein the portable radio includes a power supply and a motion detector, the motion detector being configured to turn the portable radio on after detecting movement of the movable item, and upon waking up from a sleep mode, the portable radio transmits a message to the mesh network; and a handheld configured to generate and display a real-time location map of the wireless radios and the movable item in communication with the mesh network.

2. The system of claim 1, wherein the mesh network is configured to automatically track the movement of the movable item throughout a building based upon the signals and/or data transmitted by the portable radio and received by the network.

3. The system of claim 2, wherein the mesh network is configured to alter the building environment of an area of the building after the mesh network determines that the movable item has entered or exited the area.

4. The system of claim 2, wherein the mesh network is configured to direct heating, cooling, and lighting equipment to alter the building environment of the area.

5. The system of claim 2, wherein the mesh network is configured to identify the movable item.

6. The system of claim 5, wherein the portable radio comprises a processor and a global positioning system (GPS) unit.

7. The system of claim 5, wherein the movable item is an item of office furniture, equipment, or a container.

8. The system of claim 5, wherein the movable item is a personal identification device.

* * * * *